March 10, 1925.  
D. BLOOM  
BASKET  
Filed Dec. 3, 1923  
1,529,110  
2 Sheets-Sheet 1
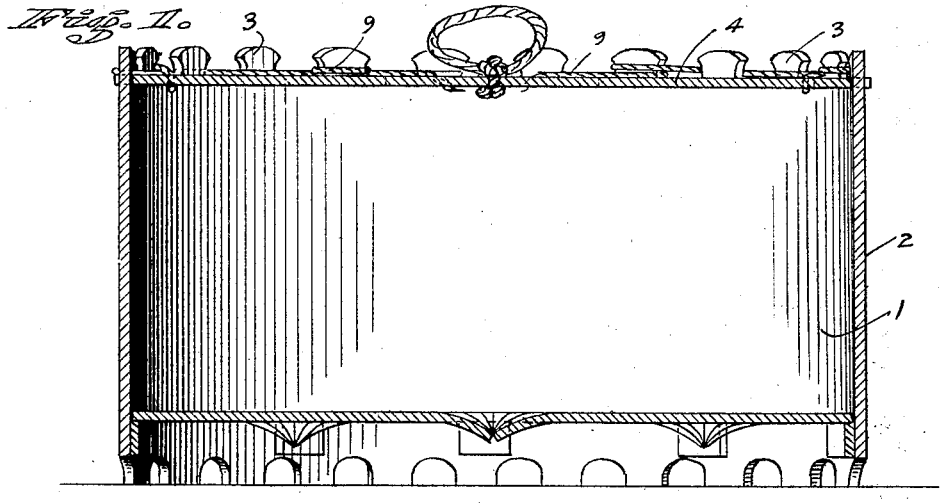
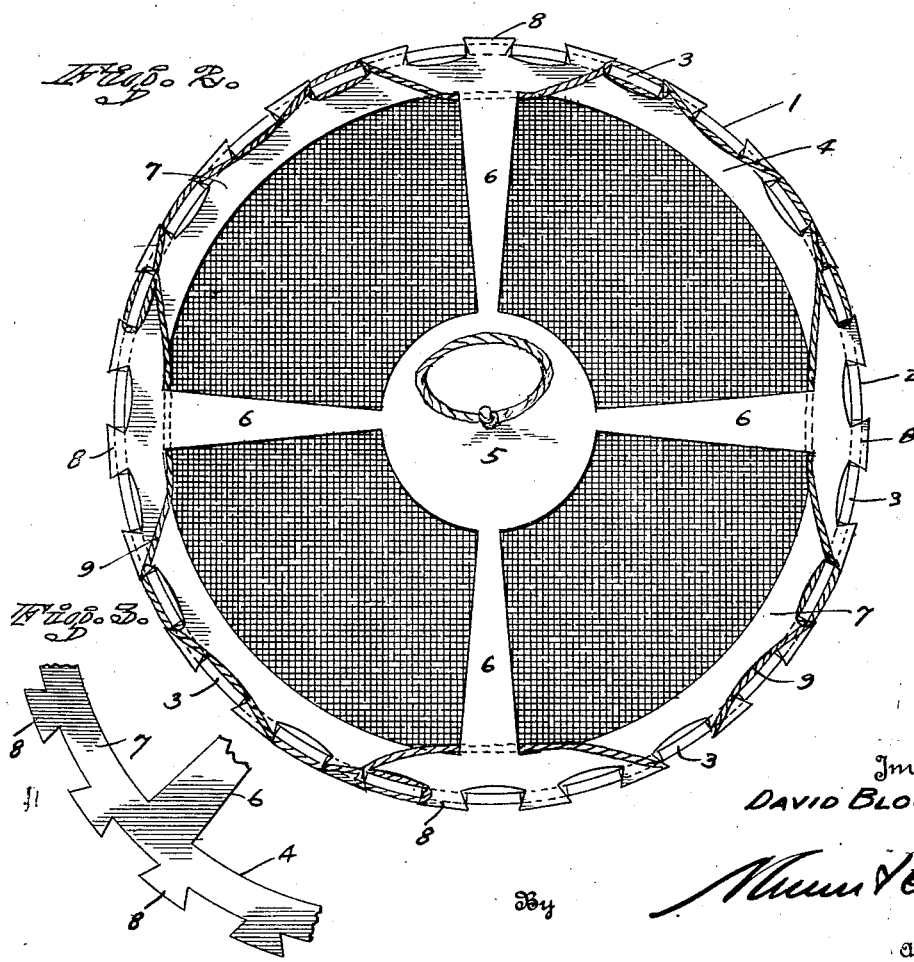
Inventor  
DAVID BLOOM  
By  
Attorneys

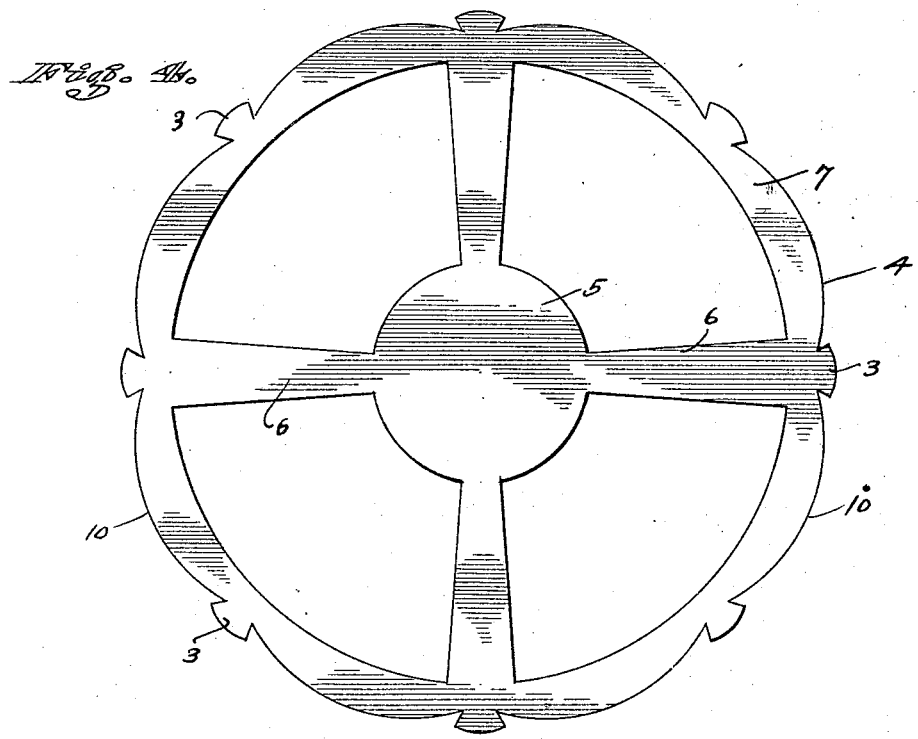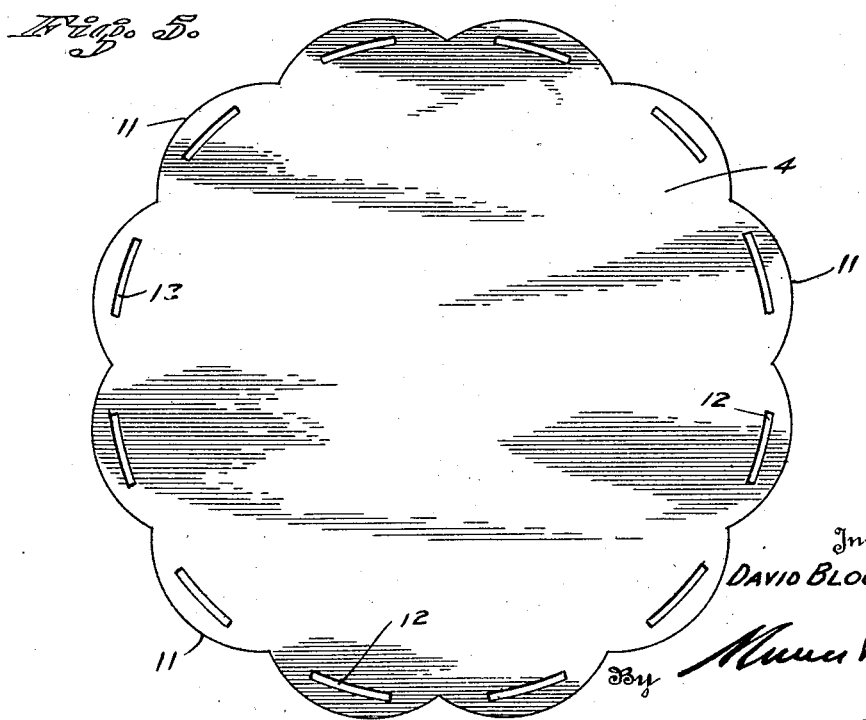

Patented Mar. 10, 1925.

1,529,110

UNITED STATES PATENT OFFICE.

DAVID BLOOM, OF BERKELEY, CALIFORNIA.

BASKET.

Application filed December 3, 1923. Serial No. 678,307.

*To all whom it may concern:*

Be it known that I, DAVID BLOOM, a citizen of the United States, and a resident of Berkeley, county of Alameda, State of California, have invented a new and useful Basket, of which the following is a specification.

The present invention relates to improvements in baskets, and its particular object is to produce a basket particularly adapted for the fancy packing and display of fruit such as artichokes, apples, pears and any other suitable articles. The present invention constitutes an improvement or a modified form of the invention disclosed in my application Serial Number 671,787, and distinguishes from the same particularly in the manner of securing the cover to the basket.

The general scheme of the invention is to produce a basket of a castle-like appearance, of open construction so as to allow of ample circulation of air, and a basket having a cover which while practical in every respect, easy to secure and easy to remove, at the same time improves the appearance of the basket and fits into the general plan of the same from an æsthetic point of view.

The preferred form of my basket is illustrated in the accompanying drawings, in which Figure 1 shows a vertical section through the same; Figure 2 a top plan view; Figure 3 a detail view of the cover used with the basket; and Figures 4 and 5 detail views of modified forms of covers adapted to be used on the same basket. While I have shown only the preferred form of the invention, I wish to have it understood that various changes or modifications may be made within the scope of the claims hereto attached without departing from the spirit of the invention.

The side wall (1) of my basket (2) is preferably made cylindrical in form, but can be changed to any polygonal form without leaving the scope of the present invention. The top edge of the side wall is recessed as shown in Figure 1 to give the general appearance of the battlement of a castle. It will be noted that the projections or tongues (3) forming the recesses are wider on top than in their lower portion so that a cord may be laced around the projections without any danger of being pushed off upwardly.

The cover (4) illustrated in Figure 3 is of open construction and preferably comprises a central portion (5) and spokes (6) extending therefrom and connecting with a rim portion (7) which latter is provided with peripheral projections (8) formed to fit in the recesses of the battlement. The latter projections may be made of any fancy form adapted to enhance the artistic value of the basket, and are shown in the drawing as widening outwardly to create the artistic effect of a firm interlocking unit.

To hold the cover in place a cord (9) is used, which latter is interlaced with the tongues or projections of the battlement and preferably with portions of the open cover itself. In the preferred form, for instance, the cord may be passed around one tongue so as to be held against upward motion, then passed in front of the next tongue, lying on top of the cover of course, and around the third tongue, from which it may be passed over the rim and under one of the spokes of the cover until it reaches the first tongue on the other side of the spoke, where the same process may be repeated.

It will be seen that in this manner the cover is firmly held in place and may be at any time removed by merely untying the cord.

The cover shown in Figure 4 is distinguished from that shown in Figure 3 by the fact that less tongues are provided and that the same are spaced further apart, the space between the tongues being filled by projecting rim portions (10).

In the form shown in Figure 5, the rim of the cover is scalloped, this is, formed with rounded projections or lobes (11) and with slots (12) provided near the rim adapted to be brought in registry with the projections of the battlement.

I claim:

1. In a basket of the character described, a side wall having a recessed top edge, a cover having projections extending therefrom adapted to be received in the recesses of the side wall and a flexible member adapted to be interlaced with the recessed top edge for holding the cover in place.

2. In a basket of the character described, a side wall having a recessed top edge, a cover having projections extending therefrom adapted to be received in the recesses of the side wall and a flexible member interlaced with the recessed top edge and with portions of the cover for holding the latter in place.

3. In a basket of the character described, a side wall having a recessed top edge and a cover formed to interlock with the said top edge when moved into place, allowing a flexible member to be interlaced with the recessed side wall above the cover for holding the latter in place.

4. In a basket of the character described, a side wall having a recessed top edge and a cover formed to interlock with the said top edge when moved into place, the cover being of open construction and allowing a flexible member to be interlaced with the recessed side wall and portions of the cover for holding the latter in place.

5. In a basket of the character described, a side wall having a recessed top edge so as to present upwardly extending tongues, a cover formed for interlocking engagement with the tongues and a flexible member adapted to be interlaced with the tongues for holding the cover in place.

6. In a basket of the character described, a side wall having a recessed top edge so as to present upwardly extending tongues and a cover formed for interlocking engagement with the tongues.

7. In a basket of the character described, a side wall having a recessed top edge so as to present upwardly extending tongues and a cover having radial projections formed for interlocking engagement with the tongues.

DAVID BLOOM.